United States Patent [19]
Cistulli

[11] Patent Number: 5,946,376
[45] Date of Patent: Aug. 31, 1999

[54] CELLULAR TELEPHONE INCLUDING LANGUAGE TRANSLATION FEATURE

[75] Inventor: Steven Cistulli, Durham, N.C.

[73] Assignee: Ericsson, Inc., Research Triangle Park, N.C.

[21] Appl. No.: 08/744,101

[22] Filed: Nov. 5, 1996

[51] Int. Cl.⁶ .......................... H04M 1/21; H04M 11/00; H04Q 7/20
[52] U.S. Cl. ........................ 379/88.06; 455/566; 704/8
[58] Field of Search .................. 455/550, 566; 379/88.06, 93.17; 704/8; 707/536; 345/171, 334

[56] References Cited

U.S. PATENT DOCUMENTS

| | | | |
|---|---|---|---|
| 4,503,426 | 3/1985 | Mikulski | 345/171 |
| 4,542,478 | 9/1985 | Hashimoto et al. | 704/6 |
| 4,543,631 | 9/1985 | Kurosu et al. | 707/535 |
| 5,014,301 | 5/1991 | Maltezos | 379/88.06 |
| 5,305,374 | 4/1994 | Snyder | 379/88.06 |
| 5,351,189 | 9/1994 | Doi et al. | 704/3 |
| 5,353,335 | 10/1994 | D'Urso et al. | 379/88.06 |
| 5,371,788 | 12/1994 | Baals et al. | 379/396 |
| 5,388,251 | 2/1995 | Maskino et al. | 395/185.1 |
| 5,499,285 | 3/1996 | Morduch | 704/8 |
| 5,524,137 | 6/1996 | Rhee | 379/88.06 |

FOREIGN PATENT DOCUMENTS

| | | |
|---|---|---|
| 0 574 066 A1 | 12/1993 | European Pat. Off. . |
| 0 693 860 A2 | 1/1996 | European Pat. Off. . |
| 195 37 127 A1 | 10/1997 | Germany . |
| 02 098 263 | 3/1990 | Japan . |
| 03 104432 | 7/1991 | Japan . |
| WO 93/17530 | 9/1993 | WIPO . |

*Primary Examiner*—Willis R. Wolfe
*Attorney, Agent, or Firm*—Jenkens & Gilchrist, P.C.

[57] ABSTRACT

An apparatus for translating character strings on the display of the cellular telephone between a first and second language is disclosed. A user generated interrupt seizes control of a display driver controlling the cellular telephone display. The display driver is controlled by either a first or second language module. Operation of the language modules is controlled by a table of variables responsive to the user interrupt. The table of variables includes a first set of variables for controlling the first language module and a second set of variables for controlling the second language module. A variable set is selected in response to a user input.

5 Claims, 2 Drawing Sheets

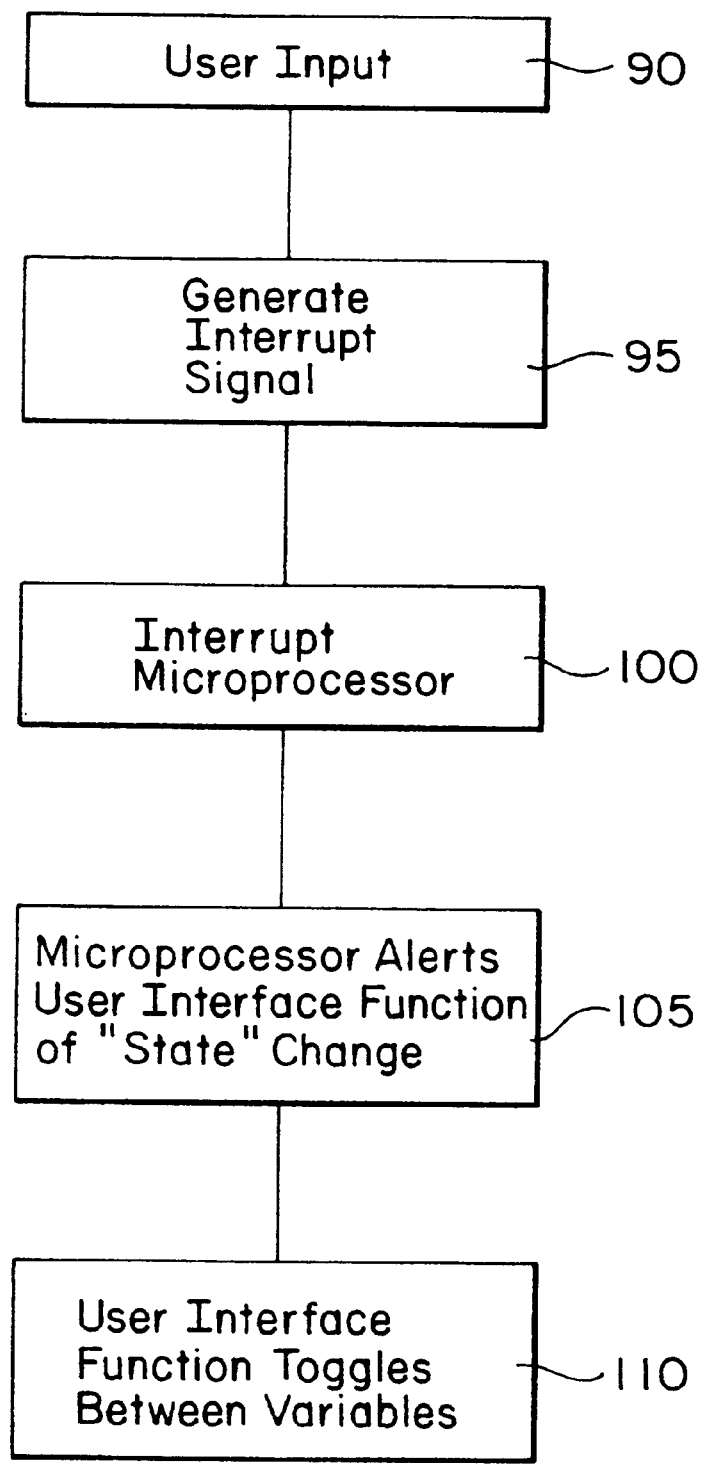

CELLULAR TELEPHONE INCLUDING LANGUAGE TRANSLATION FEATURE

BACKGROUND OF THE INVENTION

1. Technical Field of the Invention

The present invention relates to cellular telephones able to operate using multiple languages, and more particularly, to a cellular telephone having the ability to translate a character string displayed on the display of the cellular telephone between a first and a second language.

2. Description of Related Art

As many people travel around the world and visit different countries, they find that their personal cellular phones will not operate when they visit a foreign country utilizing a different transmission scheme than their phone is programmed to function under. Service providers in other country, such as Japan, provide individuals with the option, upon disembarking from their plane or boat, to rent cellular service throughout their stay.

The convenience of cellular service when traveling, whether for business or pleasure, is welcomed by the traveler. However, many problems prevent the traveler from fully utilizing the operation of their phone. For example, while the numbers on the telephone keypad are Arabic, the function keys, in say Japan, are a combination of katakana and kanji characters. Also, the informational messages presented on the display of the cellular telephone are displayed in the native Japanese character sets. Furthermore, the menu sets associated with each phone are also displayed in Japanese character strings. This makes it virtually impossible for a non-Japanese speaking user to program the phone to perform tasks such as fax service, alarm, memory recall, etc.

Presently existing solutions to this problem involve a menu driven means for altering the language shown on the cellular display. However, if a user is unable to read the initial language that cellular telephone is programmed to display, the menu driven option for altering the displayed language will be virtually useless, since the user is unable to read the presented menus. Thus, a cellular telephone providing the ability to quickly translate between a first and second language would greatly benefit travelers utilizing cellular telephone services within a foreign country.

SUMMARY OF THE INVENTION

The present invention overcomes the foregoing and other problems with a cellular telephone capable of translating a first character string in a first language to a second character string in a second language in response to a button press on the user interface of the cellular telephone. The button generates an interrupt for transmission to a microprocessor controlling the display for the cellular telephone and to a table of variables. The interrupt signal interrupts control of the microprocessor by a first language module controlling the display to present character strings in the first language on the display. The table of variables includes a first set of variables associated with the first language and a second set of variables associated with the second language. The interrupt selects the second set of variables to enable a second language module to seize control of the microprocessor and cause the display to present a string of characters in the second language that represents a translation of the first character string. By again pressing the button on the user interface, the character string may be translated back to the first language.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 2 is a flow diagram illustrating the method by which the display may be translated from a character string in a first language to a character string in a second language.

DETAILED DESCRIPTION

Figure 1:
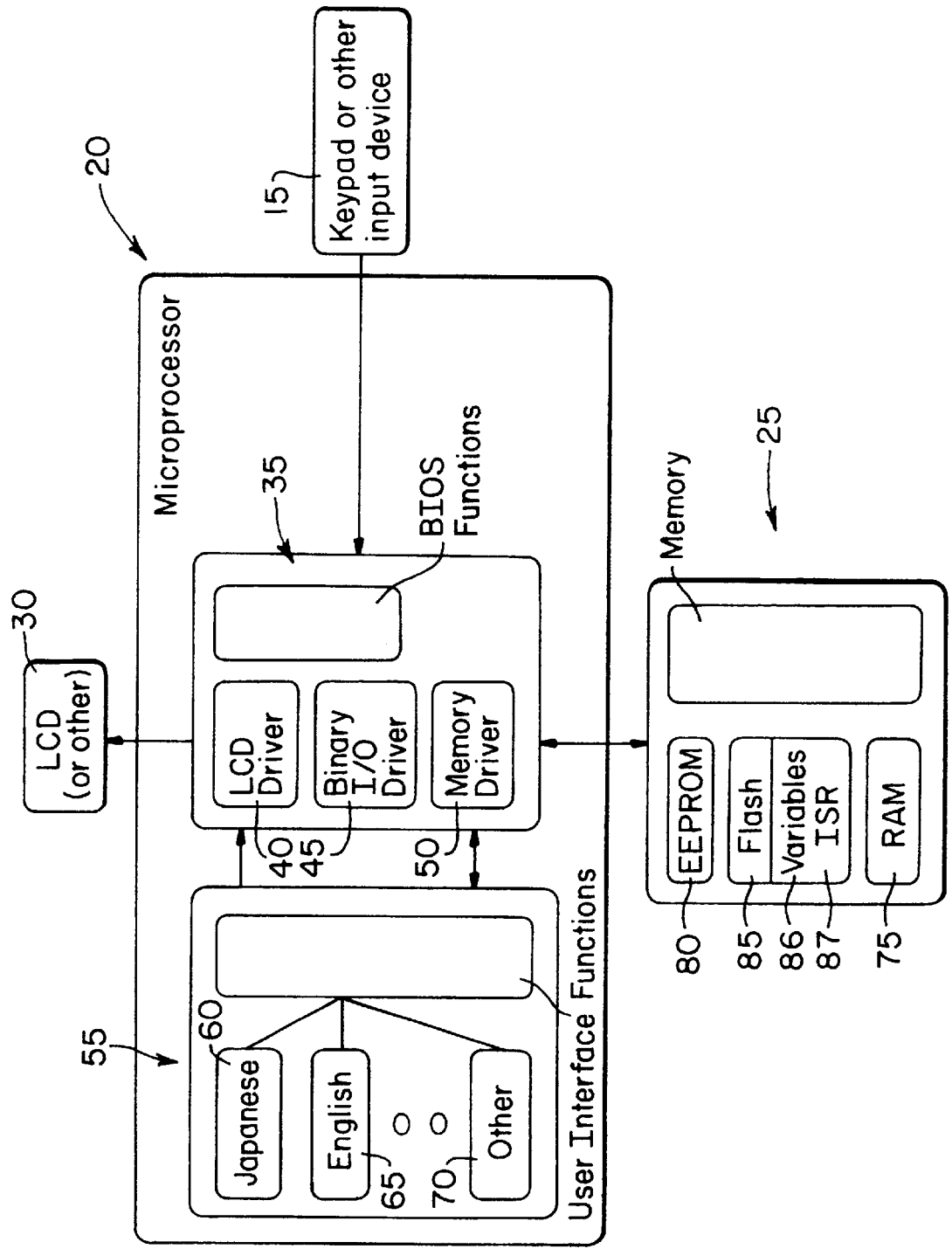
FIG. 1 is a block diagram of a cellular telephone having translation capabilities.

Referring now to the drawings, and more particularly to FIG. 1, there is illustrated a block diagram of the apparatus of the present invention. The cellular telephone utilizes a keypad or other input device 15 to input an actuation instruction to a microprocessor 20 and memory 25. In response to the actuation instruction, the microprocessor 20 and memory 25 translate a character string displayed in a liquid crystal display (LCD) 30 (or other type of display device) in a first language to a second language.

The microprocessor 20 includes a number of basic input/output system (BIOS) functionalities 35 for controlling interactions between the keypad 15, display 30 and memory 25. The BIOS functions 35 include a number of BIOS level drivers including a LCD driver 40 for driving the LCD display 30, a binary I/O driver for driving input/output for the keypad 15 and user interface functions 55, and the memory driver 50 for driving interactions with the memory 25.

The user interface functions 55 control translations of the display 30 from a character string in a first language to a character string in a second language. In the preferred embodiment, the user interface functions 55 include modules for converting between Japanese 60 and English 65. However, it should be understood that conversion between any two languages is possible utilizing other modules 70 associated with the user interface functions 55.

The memory 25 includes a random access memory (RAM) 75 for temporarily storing data utilized by the microprocessor 20. A electrically erasable programmable read only memory (EEPROM) 80 stores the controlling programs for the microprocessor 20. A flash memory 85 stores a table containing conversion variables 86 that enable the user interface functions 55 to switch between languages, for example, from Japanese 60 to English 65. A separate set of variables is associated with each language. Switching between variables is accomplished in response to an interrupt signal from the keypad 15. The flash memory 85 also includes an interrupt service routine 87 for alerting the user interface functions 55 of the change in "state" of the variables 86.

Referring now also to FIG. 2, there is illustrated a flow diagram describing the procedure by which a character string displayed on the display screen 30 of the cellular telephone is converted from a first language to a second language in response to a user input via a keypad 15. The user initiates the procedure at step 90 by providing an input to the cellular telephone through the keypad 15 of the cellular telephone. In a preferred embodiment, the input comprises a single button push on a designated keypad button. However, it should be understood that any number of keystrokes may be utilized to initiate the process.

In response to the user input, an interrupt signal is generated at step 95 and input to the BIOS functions 35 of the microprocessor 20. The interrupt signal interrupts the microprocessor 20 at step 100. The interrupt service routine (ISR) 87 alerts the user interface function 55 of the "state" change of the input signal at step 105. The interrupt signal toggles between a first and second variable set within the table of variables 86 at step 110 to translate between the first language and second language. The selected variables from the table of variables 86 enable the user interface functions 55 to control the display driver 70 according to the selected language. Interrupts are always enabled, therefore, making it possible for the user interface 55 to react to subsequent "state" changes of the input signal.

In this manner, a user unfamiliar with a foreign language may easily translate their cellular phone display between two languages, such as Japanese and English, in a simplified fashion. No attempt to struggle through a menu written in Japanese is necessary, and all the user must do is press a single button to achieve translation of messages on the display.

Although an embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for translating a character string on a display of a cellular telephone between a first and a second language, comprising the steps of:

generating a user actuated interrupt;

selecting between a first and a second set of variables in a table of variables in response to the user actuated interrupt, the first set of variables enabling a first language module to display the character string in the first language and a first language format and the second set of variables enabling a second language module to display the character string in the second language and a second language format;

alerting a user interface function of state change while the user interface function is controlling the display according to the first language module, the first language module actuating the display to display characters in the first language format;

seizing control of the display with the second language module after alerting the user interface function of the state change, the second language module actuating the display to display characters in the second language format; and controlling the display using the second language module.

2. A cellular telephone capable of translating a character string from a first language to a second language, comprising:

a button for initiating the translation of the character string from the first language to the second language;

a display unit for displaying the character string;

a first language module for actuating the display unit to display the character string in a first language format corresponding to the first language;

a second language module for actuating the display unit to display the character string in a second language format corresponding to the second language;

a table of variables including a first set of variables associated with the first language and a second set of variables associated with the second language, the selection of the first set of variables enabling the first language module to display the character string in the first language and the selection of the second set of variable enabling the second language module to display the character string in the second language; and means responsive to an input from the button for interrupting the first language module while the first language module actuates the display unit according to the first set of variables and for selecting the second language module and the second set of variables to enable the second language module to display the character string on the display unit in the second language and the second language format.

3. The cellular telephone of claim 2 wherein the first language comprises Japanese and the second language comprises English.

4. A cellular telephone capable of translating a character string in a first language to a second language, comprising:

a button for initiating the translation of the character string from the first language to the second language;

a display unit for displaying characters in a first language format corresponding to the first language and a second language format corresponding to the second language;

a table of variables including a first set of variables associated with the first language and a second set of variables associated with the second language, wherein selection of the first set of variables converts the character string to the first language and selection of the second set of variables converts the character string to the second language;

a first language module responsive to the selection of the first set of variables for actuating the display unit to display the character string in the first language format;

a second language module responsive to the selection of the second set of variables for actuating the display unit to display the character string in the second language format;

a processor responsive to an input from the button for interrupting the first language module while the first language module actuates the display unit according to the first set of variables and for selecting the second language module and the second set of variables, whereby the second language module actuates the display unit to display the character string in the second language and the second language format.

5. The cellular telephone of claim 4 wherein the first language comprises Japanese and the second language comprises English.

* * * * *